United States Patent [19]

Fox, deceased et al.

[11] Patent Number: 5,089,091
[45] Date of Patent: Feb. 18, 1992

[54] ODOR REMOVAL FROM POLYPHENYLENE ETHER RESINS BY STEAM DISTILLATION

[75] Inventors: Daniel W. Fox, deceased, late of Pittsfield, Mass., by Joyce S. Fox, heir; Louis M. Maresca, Schenectady, N.Y.

[73] Assignee: General Electric Company, Selkirk, N.Y.

[21] Appl. No.: 518,316

[22] Filed: May 4, 1990

Related U.S. Application Data

[63] Continuation of Ser. No. 291,706, Dec. 29, 1988, abandoned.

[51] Int. Cl.$^5$ ............................................. B01D 3/38
[52] U.S. Cl. .................................. 203/47; 203/92; 203/95; 203/DIG. 25; 159/DIG. 10; 528/500; 528/501
[58] Field of Search .................. 203/14, 47, 91, 92, 203/95, 96, DIG. 25; 159/DIG. 10; 528/500, 501

[56] References Cited

U.S. PATENT DOCUMENTS

| | | | |
|---|---|---|---|
| 3,306,874 | 2/1967 | Hay | 260/47 |
| 3,306,875 | 2/1967 | Hay | 260/47 |
| 3,633,880 | 1/1972 | Newmark | 259/191 |
| 3,929,930 | 12/1975 | Izawa et al. | 525/149 |
| 3,941,664 | 3/1976 | Scoggin | 203/95 |
| 3,990,938 | 11/1976 | Whitehouse | 159/DIG. 10 |
| 4,153,639 | 5/1979 | Vaughn | 203/96 |
| 4,169,114 | 9/1979 | Cooper et al. | 525/68 |
| 4,263,426 | 4/1981 | Cooper et al. | 528/486 |
| 4,369,278 | 1/1983 | Kasahara et al. | 524/147 |
| 4,808,262 | 2/1989 | Aneja et al. | 159/28.6 |

OTHER PUBLICATIONS

Weissberger, "Distillation", 1965, Second Edition, pp. 2-3, vol. IV.

Primary Examiner—Wilbur Bascomb, Jr.
Attorney, Agent, or Firm—Hedman, Gibson & Costigan

[57] ABSTRACT

Low odor polyphenylene ether resin is produced by mixing a polyphenylene ether resin having an odoriferous content in water and bringing the mixture to a boil to distill a portion or all of the water.

11 Claims, No Drawings

ODOR REMOVAL FROM POLYPHENYLENE ETHER RESINS BY STEAM DISTILLATION

This application is a continuation of application Ser. No. 07/291,706, filed Dec. 29, 1988 now abandoned.

The present invention relates to a method for preparing a low odor polyphenylene ether resin comprising distilling the resin with steam to substantially remove impurities.

BACKGROUND OF THE INVENTION

Polyphenylene ethers, also known as polyphenylene oxides, are a class of polymers widely used in industry, especially as engineering plastics in applications requiring toughness and heat resistance. In recent years, there has developed an increasing interest in employing polyphenylene ethers in food packaging applications.

In many of these food packaging applications, it is essential that the polyphenylene ether be substantially free from materials which are volatile, have undesirable odors, or would otherwise harm the food. Various materials of this kind may be present in polyphenylene ether resins. They include dialkylamines, such as di-n-butylamine, which are components of the catalyst used in the preparation of polyphenylene ethers as described hereinafter. Also present may be by-products formed in the synthesis of the substituted phenols from which polyphenylene ethers are prepared. In the case of poly(2,6-dimethyl-1,4-phenylene ether) these frequently include 2,4,6-trimethylanisole (2,4,6-TMA), 7-methyldihydrobenzofuran (7-MDBF), 2,3-dihydrobenzofuran and 2,6-dimethylcyclohexanone. Conventionally, polyphenylene ether resins are manufactured by polymerizing the monomer in solution with a liquid aromatic hydrocarbon solvent. The resin may then be purified by a semicontinuous precipitation from the solvent with methanol.

However, the solvents used in the preparation of PPE and to precipitate it are ordinarily recycled, which results in a build up of odor components to a steady state level. Also, the methanol used to precipitate the resin from the solution is a relatively poor solvent for removing some of the odoriferous components.

Thus, the issue of unpleasant odors associated with polyphenylene ether resins has been a long standing problem with many plastics processors and has resulted in many attempts to reduce the odoriferous content in the resin.

Banevicius, in commonly assigned U.S. Pat. No. 4,906,700 reduces the content of phenolic odoriferous components during the initial production stage by distilling the liquid aromatic hydrocarbon reaction solvent prior to recycling to the polymerization zone or using fresh solvent. This has the effect of reducing the steady state buildup of impurities in the solvent and therefore also the polymer resin.

Other disclosures attempt to reduce the residual amine content by devolatilization during extrusion. Kasahara et al., U.S. Pat. No. 4,369,278; Newmark, U.S. Pat. No. 3,633,880; Banevicius et al., commonly assigned U.S. Pat. application, Ser. No. 07/291,534, filed herewith, now U.S. Pat. No. 4,992,222 and Bopp, commonly assigned U.S. Pat. application, Ser. No. 206,174, filed 6/13/88, now U.S. Pat. No. 5,017,656, all disclose various forms of vacuum vented extrusion as a devolatilization technique for removing volatile components from polymer resins. In Kasahara et al., the patentee teaches the optional use of water injection into the polymer melt to aid in devolatilization. Banevicius et al., describes an extrusion devolatilization process comprising at least two stages of water or steam injection into the polymer melt to effect a more complete removal of odoriferous components. However, the above processes require the addition of water into the polymer in melt form in a vented extruder. The present invention does not involve adding water to the polymer in melt form or an extrusion process, but rather adding water to the resin in particulate form and then boiling the water to distill a portion of the water and substantially all of the odoriferous components.

Also to be mentioned is Bunting et al. commonly assigned U.S. Pat. application, Ser. No. 07/291,563, filed herewith, now U.S. Pat. No. 4,994,217, which discloses a sequence of devolatilizing apparati, such as heat exchanger devolatilizers, to effect a reduction in odoriferous content. The patentees teach the injection of high pressure water or steam in a stripping zone but do not teach mixing of water and the resin and then distillation of the water.

Surprisingly, it has now been found that where water is admixed with a polyphenylene ether resin and a portion of the water is distilled, a low odor polyphenylene ether is produced. Distillation of the water from an aqueous resin slurry unexpectedly results in the production of polyphenylene ether resins exhibiting very low odor in human organoleptic tests.

SUMMARY OF THE INVENTION

According to the present invention there are provided methods for preparing low odor polyphenylene ether resins comprising
(a) mixing
  (i) a polyphenylene ether resin having a content of odoriferous compounds, and
  (ii) water;
(b) heating the mixture obtained in (a) to distill a portion of said water and substantially all of said odoriferous compounds; and
(c) recovering said polyphenylene ether resin substantially free of said odoriferous compounds, from the residue of step (b).

Preferably, the portion of water distilled is from about 1 to about 99 percent based on the weight of the water. Especially preferred are processes wherein from about 25 to about 75 weight percent of the water is distilled. Distillation is preferred to be carried out at temperatures ranging from about 50° to about 210° C. at atmospheric, super-atmospheric and supra-atmospheric pressures.

The preferred form of the mixture is a slurry and the preferred methods of resin recovery comprise filtering or vacuum filtering, optionally followed by a drying process.

DETAILED DESCRIPTION OF THE INVENTION

The polyphenylene ethers to which the present invention is applicable are known in the art and are described in numerous publications, including Hay, U.S. Pat. No. 3,306,874 and 3,306,875, and generally comprise a plurality of structural units having the formula

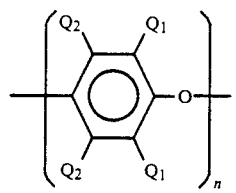

In each said units independently, each $Q_1$, is independently halogen, primary or secondary lower alkyl (i.e., alkyl containing up to 7 carbon atoms), phenyl, haloalkyl, aminoalkyl, hydrocarbonoxy or halohydrocarbonoxy wherein at least two carbon atoms separate the halogen and oxygen atoms; and each $Q_2$ is independently hydrogen, halogen, primary or secondary lower alkyl, phenyl, haloalkyl, hydrocarbonoxy or halohydrocarbonoxy as defined in $Q_1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of suitable secondary lower alkyl groups are isopropyl, sec-butyl, and 3-pentyl. Preferably, any alkyl radicals are straight chain rather than branched. Most often each $Q_1$ is alkyl or phenyl, especially $C_{1-4}$ alkyl, and each $Q_2$ is hydrogen. Suitable polyphenylene ethers are disclosed in a large number of patents. The integer n is at least about 50.

Both homopolymer and copolymer polyphenylene ethers are incuded. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ethers generally possess a number average molecular weights within the range of about 3,000 to about 40,000 and a weight average molecular weight of about 6,000 to about 80,000, as determined by gel permeation chromatography. Its instrinsic viscosity is most often in the range of about 0.3-0.6 dl/g as measured in chloroform at 25° C.

The polyphenylene ethers are typically prepared by the oxidative coupling of at least one corresponding, monohydroxyaromatic compound. Particularly useful and readily available monohydroxyaromatic compounds are 2,6-xylenol (wherein each $Q_1$ is methyl and each $Q_2$ is hydrogen), whereupon the polymer may be characterized as a poly(2,6-dimethyl-1,4-phenylene ether); and 2,3,6-trimethylphenol (wherein each $Q_1$ and one $Q_2$ is methyl and the other $Q_2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874; 3,306,875; and 4,028,341. They are generally combinations of cuprous or cupric ions, halide ions (i.e., chloride, bromide or iodide) and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, omega-hydroxyaromatic aldehydes, o-hydroxyazo compounds, beta-hydroxyoximes (monomeric and polymeric), o-hydroxyaryl oximes and beta-diketones. Also useful are known cobalt-containing catalyst systems. Suitable manganese and cobalt-containing catalyst systems for polyphenylene ether preparation are known in the art by reason of disclosure in numerous patents and publications.

The odoriferous impurities, by-products of the monomer and polymer synthesis such as aromatic hydrocarbons and oxygen containing compounds such as butanone, 2-ethylhex-2-enal and 2,3-dihydrobenzofuran; and amine components of the catalyst, such as nitrogen containing compounds such as di-n-butylamine, are removed from the polyphenylene ether resin by admixing the resin with water and heating to distill a portion of the water and essentially all of the odoriferous impurities to produce a polyphenylene ether resin essentially free from odoriferous compounds. Essentially free from odoriferous compounds is defined to be that level of odoriferous compounds which is difficult to detect in human organoleptic tests.

In general, the polyphenylene ether resin, preferably in the form of a powder, is suspended in water, preferably to form a slurry-like mixture, in any suitable apparatus. The mixture is then heated to boiling, the distillation temperature being dependent on the pressure employed. Different distillation pressures are contemplated, ranging from below atmospheric to above atmospheric, and may be adjusted as desired.

Distillation is continued until all of the water is distilled or some fraction thereof as desired. The polyphenylene ether may then be recovered from the remaining mixture by a filtration or vacuum filtration process in any conventional apparatus. It is also contemplated that filtration may be supplemented by a drying process.

DESCRIPTION OF THE PREFERRED EMBODIMENTS

The following examples illustrate the present invention. They are not to be construed to limit the claims in any manner whatsoever.

EXAMPLE 1

Polyphenylene ether resin (150 g) was suspended in 1500 ml of deionized water. The mixture was heated to reflux and approximately 500 ml of the water was distilled. The distillate exhibited a strong odor, while the remaining slurry had only a slight odor. The slurry was filtered and the filtrate was found to have very little odor. Samples of the distillate and filtrate were analyzed using gas chromatography and mass spectometry to determine compositions. The distillate showed the presence of butanal, toluene and 2,3-dihydrobenzofuran. The filtrate did not contain any major amounts of impurities. The polyphenylene ether resin filtered from the mixture was air-dried overnight at room temperature and then further dried in a vacuum oven at 75° C. for about 16 hours. The melt behavior of the isolated powder was compared to the initial polyphenylene ether in a Tinius Olsen Plastimeter. Results are shown in Table 1.

TABLE 1

| Sample | I.V., dl/g | |
|---|---|---|
| | Powder | Extrudate* |
| Initial polyphenylene ether resin | 0.473 | 0.595 |
| Purified powder after air drying at room temperature for 16 hours | 0.473 | 0.587 |
| Purified powder after drying in vacuum oven at 75° C. for 16 hours | 0.477 | 0.614 |

*Heated for 2 minutes at 300° C. in a Tinius Olsen Plastimeter
I.V. = Intrinsic Viscosity

EXAMPLE 2

Polyphenylene ether resin (750 g) was suspended in 2250 ml of water and heated to reflux until 750 ml of the water was distilled. Samples of the distillate were removed at the beginning, middle and end of the distillation. The distillate was found to have a strong odor while the residual slurry exhibited only a faint smell. The residual slurry was then filtered. The filtrate and distillate were then analyzed for odoriferous components by gas chromatography/mass spectometry.

The distillate was found to contain butanal, 2-butanone, toluene, 2-ethylhex-2-enal, and 2,3-dihydrobenzofuran. At the beginning of distillation, the distillate contained all of the odoriferous contaminants. In the middle of distillation, butanal, 2-butanone and toluene, were observed in the distillate and at the end of distillation there was only trace amounts of butanal, 2-butanone and toluene. The filtrate was found to comprise trace amounts of toluene only. Analysis of the PPO powder showed no apparent decrease in the concentration of 2,4,6-trimethylanisole. Initial PPO powder was analyzed to comprise 112 ppm of 7-methyldihydrobenzofuran and 115 ppm in the purified powder. It appears that higher temperatures and pressures are required to remove the odoriferous 7-methyldihydrobenzofuran and 2,4,6-trimethylanisole. The melt behavior of the isolated powder and initial PPO resin is shown in Table 2.

TABLE 2

| Material | Time at 300° C.* | I.V., dl/g |
|---|---|---|
| Initial PPO powder | 0 | 0.471 |
| Initial PPO powder | 2 | 0.559 |
| Isolated Purified PPO | 0 | 0.483 |
| Isolated Purified PPO | 2 | 0.555 |

*In a Tinius Olsen Plastimeter
I.V. = Intrinsic Viscosity

EXAMPLES 3-5

Example 2 was repeated several times and the results were duplicated. Polyphenylene ether resin (750 g) was suspended in water (2250 g) and heated to reflux. After distilling 750 g of the water, the mixture was cooled and vacuum filtered. The product was air dried for 24 hours. A low odor powder was produced.

EXAMPLE 6

Example 2 was repeated on a larger scale and the results were duplicated. Polyphenylene ether resin (2250 g) was suspended in water (6750 g) and heated to reflux. After distilling 2250 g of water, the mixture was cooled and vacuum filtered. The filtrate was air dried for 72 hours. A low odor powder was produced.

EXAMPLE 7

Purified polyphenylene ether resin from Example, 6 was blended with other resins and tested for physical properties. A commercial resin composition was also tested. The results along with compositional data are set forth in Table 3.

TABLE 3

| | Example | |
|---|---|---|
| | 7 | 7** |
| Composition | | |
| PPO, g (purified*) | — | 490 |
| PPO, g (commercial grade) | 490 | — |
| Zytel 101, g | 410 | 410 |
| Kraton G 1651, g | 100 | 100 |
| MA, g | 3.5 | 3.5 |
| Properties | | |
| Tensile Strength, psi | | |
| Yield | 8200 | 8600 |
| Break | 7700 | 7700 |
| Elongation, % | | |
| Yield | 6.0 | 6.0 |
| Break | 36.5 | 36.4 |
| Notched Izod, ft-lbs/in | 3.72 | 3.91 |

* = Example 6
MA = Maleic Anhydride
Zytel 101 = A Nylon-6,6 (E. I. Dupont)
PPO = Polyphenylene Ether (General Electric)
** = Comparative Example

EXAMPLE 8

Purified polyphenylene ether resin from Example 6 was blended with a high-impact polystyrene and tested for physical properties. A commercial comparison resin was also tested. The results along with compositional data are set forth below in Table 4.

TABLE 4

| | Example | |
|---|---|---|
| | 8 | 8** |
| Composition | | |
| PPO, g (purified*) | 600 | — |
| PPO, g (commercial grade) | — | 600 |
| HIPS | 400 | 400 |
| Properties | | |
| Tensile Strength, psi | | |
| Yield | 8900 | 9200 |
| Break | 7500 | 7600 |
| Elongation, % | | |
| Yield | 7.4 | 6.7 |
| Break | 14.9 | 13.4 |
| Notched Izod, ft-lbs/in | 2.89 | 2.84 |

* = Example 6
HIPS = High Impact Polystyrene (Huntsman Chemical)
PPO = Polyphenylene Ether Resin (General Electric)
** = Comparative Example

EXAMPLE 9

1500 g of purified polyphenylene ether resin from Example 6 was extruded at 300° C. in an extruder equipped with vacuum venting and the extrudate tested for physical properties. A commercial comparison was also tested. The results are set forth in Table 5 below.

TABLE 5

| | Example | |
|---|---|---|
| | 9* | 9** |
| Composition | | |
| I.V. (powder), dl/g | 0.46 | 0.46 |
| I.V. (extrudate), dlg | 0.60 | 0.57 |
| Tensile Strength, psi | | |
| Yield | 11,200 | 11,000 |
| Break | 8500 | 8300 |
| Elongation, % | | |
| Yield | 6.0 | 6.0 |
| Break | 14.2 | 20.4 |
| Notched Izod, ft-lbs/in | 0.88 | 0.85 |

I.V. = Intrinsic Viscosity
* = Purified PPO Resin
** = Comparative Example With Unpurified PPO Resin The above mentioned patents, patent applications and publications are incorporated herein by reference.

Many variations of the present invention will suggest themselves to those skilled in this art in light of the above detailed description. For example, instead of poly(2,6-dimethyl-1,4-phenylene ether), poly(2,3,6-trimethyl-co-2,6-dimethyl-1,4-phenylene ether) resin can be used. Instead of distilling only a portion of the water, almost all or all of the water can be distilled. The pressure of distillation may be varied to lower or raise the distillation temperature as desired.

All such obvious modifications are within the full intended scope of the appended claims.

It is claimed:

1. A method for preparing a polyphenylene ether resin substantially free from odoriferous impurities comprising by-products of monomer and polymer synthesis, said process consisting essentially of:
   (a) mixing
      (i) a polyphenylene ether in particulate form having a content of said odoriferous by-products, and
      (ii) water; to form an aqueous suspension;
   (b) distilling the aqueous suspension obtained in (a) to boil off a portion of said water to remove substantially all of said content of odoriferous by-products from the particulate polyphenylene ether resin; and
   (c) recovering said polyphenylene ether resin substantially free of said content of odoriferous by-products, from the residue of step (b).

2. A method as defined in claim 1 wherein said polyphenylene ether resin is selected from the group consisting of poly(2,6-dimethyl-1,4-phenylene ether), poly(2,6-dimethyl-co-2,3,6-tri-methyl-1,4-phenylene ether) and mixtures thereof.

3. A method as defined in claim 1 wherein said polyphenylene ether resin is poly(2,6-dimethyl-1,4-phenylene ether).

4. A method as defined in claim 1 wherein said odoriferous by-products are selected from the group consisting of aromatic hydrocarbons, oxygen-containing compounds, nitrogen-containing compounds and mixtures thereof.

5. A method as defined in claim 1 wherein said water comprises deionized water.

6. A method as defined in claim 1 wherein said aqueous suspension is distilled to boil off from about 1 to about 99 weight percent water based on the weight of the added water.

7. A method as defined in claim 6 wherein said aqueous suspension is distilled to boil off from about 25 to about 75 weight percent of water based on the weight of the added water.

8. A method as defined in claim 6 wherein the distillation occurs at from about 50 to about 210° C. at pressures ranging from below atmospheric to above atmospheric.

9. A method as defined in claim 1 wherein said aqueous suspension is an aqueous resin slurry.

10. A method as defined in claim 1 wherein step (c) comprises filtering or vacuum filtering.

11. A method as defined in claim 10 wherein said step (c) also comprises drying said polyphenylene ether resin after said filtering or vacuum filtering.

* * * * *